Oct. 13, 1931.     O. M. SUMMERS     1,826,839
REFRIGERATING APPARATUS
Filed June 30, 1927      2 Sheets-Sheet 1

Inventor
Otto M. Summers
By Spencer Hardman + Fehr
his Attorneys

Oct. 13, 1931.    O. M. SUMMERS    1,826,839
REFRIGERATING APPARATUS
Filed June 30, 1927    2 Sheets-Sheet 2

Inventor
Otto M. Summers
By Spencer Hardman & Fehr
his Attorneys

Patented Oct. 13, 1931

1,826,839

UNITED STATES PATENT OFFICE

OTTO M. SUMMERS, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed June 30, 1927. Serial No. 202,615.

The present invention relates to apparatus for controlling the flow of fluid and particularly to apparatus for controlling the flow of fluid through a chamber such as, for example, a fluid chamber of a refrigerating system.

One of the objects of the present invention is to provide for the removal of certain valve elements and operating mechanism therefor while preventing the escape of fluid from the fluid circuit during such removal.

One application of the improved apparatus is in connection with a chamber in which the flow of fluid is controlled by a float controlled valve and it is another object of the invention to provide for removal of a valve element and the operative connections between the float and the valve element without removing the float.

Another object is to provide a novel float mechanism so constructed that the float will provide adequate valve actuating force by a small movement thereof in order to permit the use of a relatively small float chamber.

One embodiment of the present invention is particularly applicable to a refrigerating system in which the flow of fluid through a chamber is to be controlled by a float. In such systems, a quantity of lubricating oil is carried with the refrigerating fluid and floats upon the refrigerant within the chamber. It is a further object of this invention to prevent the accumulation of an excessive amount of oil within such chamber.

Further objects and advantages of the present invention will be apparent from the following description, reference being had to the accompanying drawings, wherein a preferred form of embodiment of the present invention is clearly shown.

Figures 1, 2:
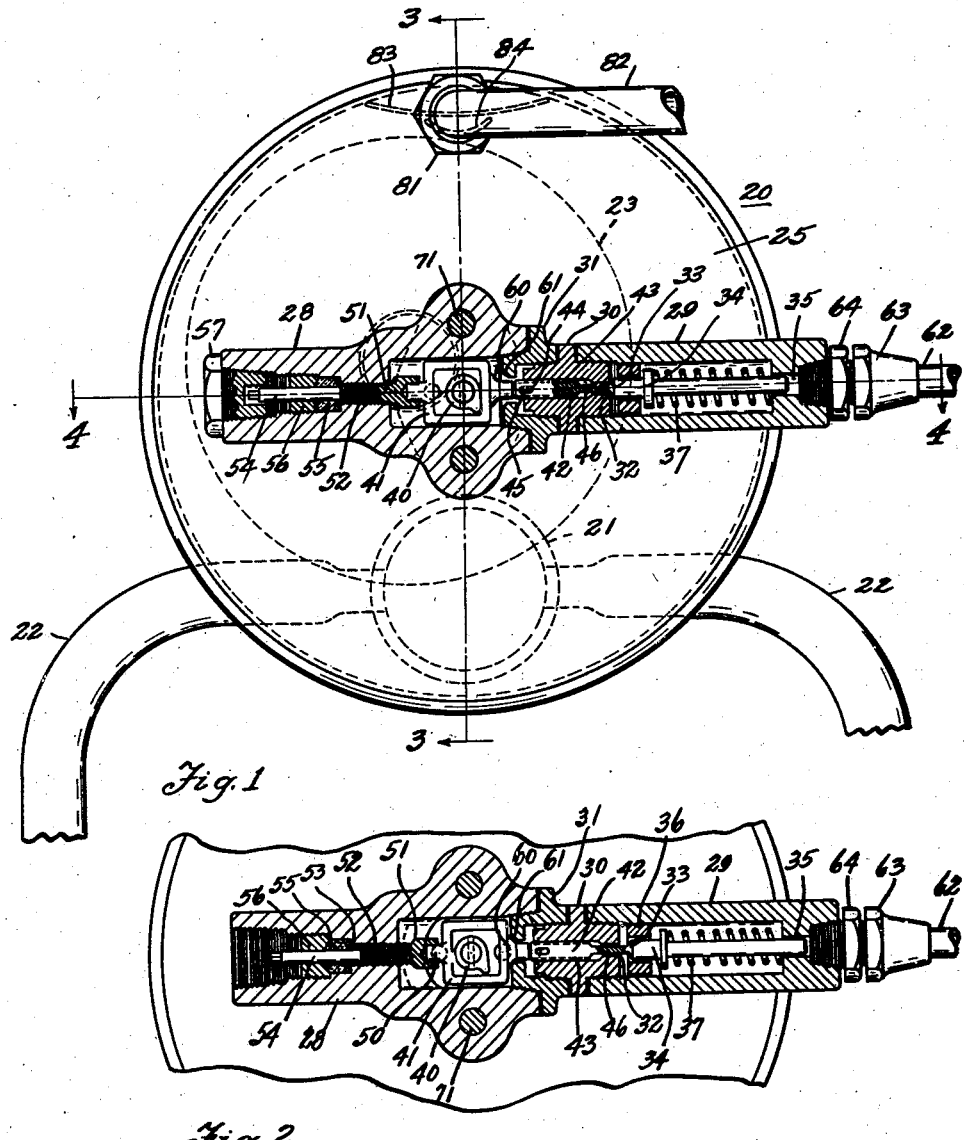
Fig. 1 is a fragmentary front view of a refrigerant evaporator provided with valve mechanism constructed in accordance with the present invention, the valve mechanism being shown in vertical section.
Fig. 2 is a fragmentary view similar to Fig. 1 showing the valve mechanism in a position for preventing the flow of refrigerant from the float chamber while providing for the removal of the float controlled valve element.
Figure 3:
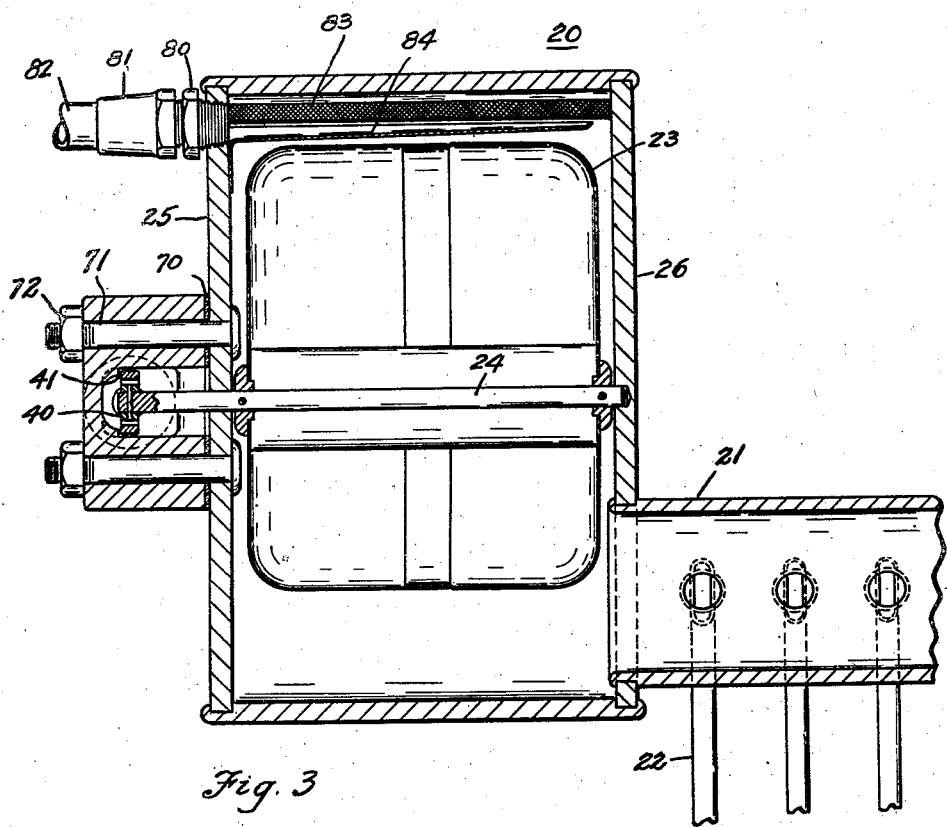
Figure 4:
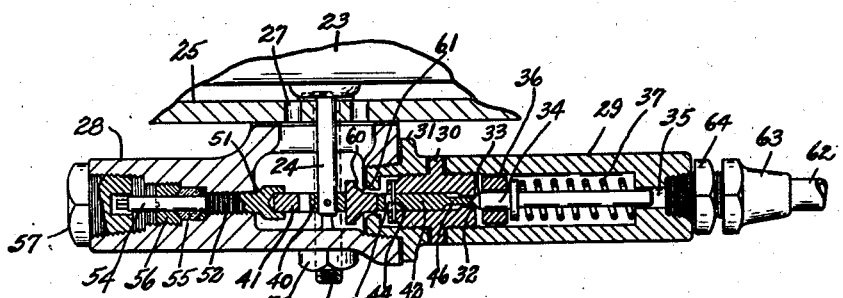

Figs. 3 and 4 are fragmentary views taken respectively on the lines 3—3 and 4—4 of Fig. 1.

Referring to the drawings, 20 designates a float chamber connected with a manifold 21 for conducting refrigerant to a plurality of refrigerant ducts or heat interchange elements 22. The manifold 21 need be only large enough to conduct the refrigerant efficiently to the ducts 22, and the chamber 20 although larger in cross sectional dimensions than the manifold 21 is of a size sufficient to provide for the movements of a float cylinder 23 and the necessary amount of liquid refrigerant for buoying the float 23 in a position for controlling the chamber inlet valve which will be described.

The float 23 is eccentrically mounted upon a shaft 24 rotatably supported by the end walls 25 and 26 of chamber 20 and having one end thereof extending beyond the chamber wall 25. The wall 25 is provided, as shown in Fig. 4, with passages 27 connecting the chamber with a refrigerant inlet duct comprising separable elements 28 and 29 and coupling elements 30 and 31. Element 30 provides a valve seat 32 which co-operates with valve 33 slidably supported by the duct members 29. The valve 33 includes a stem 34 which is loosely guided by an inlet passage 35 in the member 29 and loosely guided by a block 36 carried by the member 29. A spring 37 urges valve 33 against its seat 32. The shaft 24 extends within the conduit member 28 and there carries a cam 40 which cooperates with a yoke 41 adapted to bear against a member 42 which is slidably supported by the coupling member 30 and is provided with longitudinally extending grooves 43 to provide for the passage of refrigerant along said member 42. A pin 44 carried by the coupling 30 extends through a slot 45 in the slidable member 42 in order to maintain the member 42 assembled with the member 30 while providing for relative movement between these members. The member 42 is provided with a stem 46 having in its end nearest the valve 33 a conical recess for receiving the conical end of said valve.

The yoke 41 is provided with a shank 50 slidably supported by a cup-shaped element 51 formed on the end of a screw 52 threadedly engaging a tapped hole 53 leading from the interior to the exterior of the coupling member 28. The screw 52 is provided with an operating element or stem 54 extending through packing 55 and a packing gland 56 so that the stem may be operated from the exterior of the conduit member 28. Normally the stem is covered by a plug 57. The yoke member 41 is provided with a valve element 60 adapted to co-operate with a valve seat 61 provided by the coupling 31.

As the liquid level in the float chamber 26 lowers due to evaporation of refrigerant the shaft 24 will rotate counterclockwise, as viewed in Figs. 1 and 2, in order to move the yoke 41 and slidable elements 42 toward the right, as viewed in Figs. 1 and 2. Downward movement of float 23 therefore causes the valve 33 to be moved from its seat to permit the passage of liquid refrigerant through the conduit members 29 and 28 from a source of liquid refrigerant supply under pressure, said source being usually the receiver of a refrigerant condenser which is connected with the conduit member 29 by a pipe 62 and couplings 63 and 64.

The spring 37 exerts adequate tension on the valve 33 to prevent same from leaking and by engaging the elements so that the float moves eccentrically in a direct vertical direction, a large float can be used, which will provide adequate force for overcoming the tension of spring 37 during normal operation and which will provide such force through only a relatively small movement in a vertical direction. Therefore, the upper chamber wall need be spaced only a short distance above the top surface of the float and consequently the cylindrical portion can be made of small diameter tubing. By providing this type of movement, the chamber can be made narrow, thus conserving material in the construction of the evaporator as well as conserving in refrigerant.

In case the valve 33 should fail to move from its seat when the float descends, the plug 57 may be removed from the stem 54 turned by a suitable socket wrench in order to move yoke 41 and the slidable element 42 toward the right and the valve 33 from its seat. In case it is desired to remove the valve 33 for repairs or replacement it will not be necessary to withdraw the refrigerant from the float chamber before unscrewing the conduit member 29 from the coupling 30. The stem 54 may be turned so as to move the valve element 60 provided by the yoke 41 into engagement with the valve seat 61. When this has been done it is apparent that no refrigerant can flow from the float chamber through the conduit 28.

Before shipment, the valve element 60 is forced by stem 54 against its seat 61. Thus refrigerant cannot escape from the evaporator by way of the inlet couplings and the valve 33 is held away from its seat 32. Although float 23 will move about within the chamber 20, no motion will be transmitted to the valve 33 during shipment and therefore neither the valve nor the seat is subject to injury which ordinarily would occur if the valve is permitted to strike the seat.

The conduit member 28 and a sealing gasket 70 are attached to the wall 25 of float chamber 20 by bolts 71 and nut 72. The construction and arrangement of the valve operating mechanism is such that the member 28 may be removed from the float chamber while a portion of the valve operating mechanism remains assembled within inlet conduit and float member 23 and shaft 24 remains assembled with the float chambers. This construction has certain advantages over prior constructions in requiring the disassembling of the float chamber in order to make the valve and its operating mechanism accessible.

Adjacent the top thereof the float chamber 20 is connected by coupling members 80 and 81 with a pipe 82 leading to the refrigerant compressor pump. It is well known that a certain amount of lubricating oil contained within the compressor will be carried by the refrigerant into the evaporator.

I have discovered that by reducing the free surface of the liquid within the float chamber 20 to a minimum that a heavy layer of oil will not collect on the top of the liquid refrigerant. All of the vapor refrigerant passing from the evaporator must pass through the layer of oil and by providing a relatively narrow free surface through which the gas passes, violent ebullition will take place. This violent ebullition will cause the oil to foam and when in this state it is readily carried upwardly with the vapor in the form of a fine spray to the upper portion of the chamber. Some of the oil conveyed upwardly with the vapor will be carried with the vapor directly into outlet coupling member 80. Other portions of the oil will be caught by the oil collector, which is herein shown as a relatively fine-meshed screen 83 and which is mounted adjacent the top of float chamber 20 and above a trough 84. The upper part of chamber 20 in which the lubricant is collected may be termed a lubricant collecting zone which is located adjacent the outlet of the chamber and from which lubricant can be readily conveyed to the outlet. The flow of lubricant to the outlet is augmented by the trough 84 disposed below the screen. The lubricating oil dripping from the screen 83 is caught by the trough 84 whence it is conducted by pipe 82 to the compressor. In this way the lubricating oil is automatically removed from the evaporator.

By virtue of this method of operation a more uniform pressure is maintained in the chamber and a more uniform temperature is insured because at no time will there be present a thick layer of oil upon the refrigerant which oil would act to impede vaporization which in effect would require a relatively lower pressure in the evaporator and consequently inefficient operation.

In order to provide a small free surface, the manifold 21 is connected at the lower portion of the chamber below the oil level and the layer of oil is contained within the chamber 20 only. The chamber can be made large enough only to accommodate the float, and the space between the float and chamber walls will be relatively narrow. Thus the surface of oil through which the gas moves is relatively narrow.

While the form of embodiment of the present invention as herein disclosed, constitutes a preferred form, it is to be understood that other forms might be adopted, all coming within the scope of the claims which follow.

What is claimed is as follows:

1. In a refrigerant control apparatus, a liquid chamber, a conduit connected with the chamber, valves in series controlling the flow of liquid through the conduit, means for controlling the valve nearest the chamber, and means responsive to the quantity of liquid in said chamber for controlling the other valve.

2. In a refrigerant control apparatus, a fluid chamber, a conduit connected with the chamber comprising separable members, a valve in each member for controlling the flow of fluid through the conduit, means for controlling the valve in the conduit member nearest the chamber, and means responsive to the condition of the fluid in said chamber for controlling the valve in the other conduit member, said last named valve being constructed and arranged to permit removal of its movable valve element when the conduit elements are separated.

3. In a refrigerant control apparatus, a liquid chamber, a conduit connected with the chamber, a valve including a removable valve element for controlling the flow of liquid through the conduit, means responsive to the quantity of liquid in said chamber for controlling said valve, and means for preventing flow of liquid from the chamber when said valve is removed.

4. In a refrigerant control apparatus, a closed float chamber, a conduit connected with said chamber, a valve for controlling the flow of refrigerant through said conduit, and means for operating said valve including a float in said chamber, said valve and means being arranged for removal of the valve while the float chamber is maintained closed.

5. In a refrigerant control apparatus, a closed float chamber, a conduit connected with said chamber, a valve for controlling the flow of refrigerant through said conduit, and means for operating said valve including an eccentrically pivoted float cylinder in said chamber, said valve and means being arranged for removal of the valve while the float chamber is maintained closed.

6. In a refrigerant control apparatus, a float chamber, a conduit detachably secured to a wall of the chamber having a passage connecting the conduit with the chamber, a valve in said conduit, and means for controlling the valve including a float in the chamber, said means being constructed and arranged to permit removal of the conduit and valve while the float remains assembled with the chamber.

7. A refrigerant cooling unit comprising a float chamber, a valve for controlling the flow of refrigerant into the chamber, valve operating means including an eccentrically pivoted float in said chamber, the chamber being of a size sufficient only to accommodate the movement of the float, a plurality of refrigerant ducts, and a manifold for connecting the ducts with the float chamber, the manifold being smaller in cross-sectional dimensions than the float chamber.

8. A refrigerant evaporator comprising a float chamber, refrigerant inlet and outlet conduit for said chamber, and means adjacent said outlet conduit for collecting lubricant from said chamber and returning same to said outlet conduit, said means including a collecting device adjacent the top of said chamber and above said outlet conduit and a trough disposed beneath said collecting device and above the liquid level in the chamber.

9. A refrigerant evaporator comprising a chamber containing a float, a refrigerant inlet conduit for said chamber, a refrigerant outlet conduit for said chamber adjacent the top thereof, a screen disposed above said outlet conduit for collecting lubricant carried thereto by the ebullition of liquid refrigerant and a trough disposed beneath said screen for returning the collected lubricant to the outlet conduit.

10. A refrigerator evaporator comprising, a float chamber, a conduit connected therewith, a reciprocating valve for controlling the flow of fluid through said conduit, a rotatable shaft means connected with said shaft for imparting reciprocating movement to said valve, and a float in said chamber for rotating said shaft.

11. A refrigerator evaporator comprising a float chamber, a conduit connected therewith, a reciprocating valve for controlling the flow of fluid through said conduit, a rotatable shaft, a cam operatively connected with said shaft for imparting a reciprocating movement to said valve, and a float in said chamber for rotating said shaft.

12. In a refrigerant control apparatus, a fluid chamber, a conduit connected with the chamber, valves in series controlling the flow of fluid through the conduit, means responsive to the condition of the fluid in said chamber for controlling one of said valves, and a single other means for controlling both valves.

13. In a refrigerant control apparatus, a fluid chamber, a conduit connected with the chamber, valves in series controlling the flow of fluid through the conduit, means responsive to the condition of the fluid in said chamber for controlling one of said valves, and a single other means for rendering the first means ineffective and for closing the other of said valves.

14. A refrigerant evaporator comprising a chamber containing a body of liquid including refrigerant and lubricant and in which the refrigerant vaporizes and thereby creates a spray of lubricant and refrigerant, an outlet for said chamber and means for directing lubricant to the outlet conduit including a collector disposed in the spray and a lubricant conveying means associated with the collector and outlet conduit.

15. A refrigerant evaporator comprising a chamber containing a body of liquid including refrigerant and lubricant and in which the refrigerant vaporizes and thereby creates a spray of lubricant and refrigerant, an outlet for said chamber and means for directing lubricant to the outlet conduit including a collector disposed in the spray and extending substantially across the top of the chamber.

16. In a refrigerating system of the type having a closed fluid chamber, a valve for controlling the flow of fluid through said chamber, a float within said chamber, operative connections between said valve and float for controlling said valve, said connections also including a second valve adapted to control the flow through said chamber.

17. In a refrigerating system of the type having a closed fluid chamber, a valve for controlling the flow of fluid through said chamber, mechanical valve actuating mechanism responsive to the condition of the fluid in said chamber for controlling said valve, said mechanism including a second valve adapted to control the flow of fluid through said chamber.

18. In a refrigerating system of the type having a closed fluid chamber, a valve for controlling the flow of fluid through said chamber, a float within said chamber, mechanical valve actuating mechanism responsive to the condition of the fluid in said chamber for controlling said valve, and a second valve interposed between the first valve and the chamber and adapted to control the flow of fluid.

19. In a refrigerant control apparatus, a float chamber for liquid refrigerant, a conduit connected with said chamber, a removable valve seat, a valve cooperating with said seat for controlling the flow of refrigerant through said chamber, means for operating said valve including a float in said chamber, and a shut off valve between said valve seat and said chamber.

20. In a refrigerating system in which lubricant and refrigerant are circulated, an evaporator comprising a closed chamber containing a body of liquid including liquid refrigerant and a layer of lubricant floating on the refrigerant, heat conducting means associated with the chamber, the free surface of the liquid body being proportioned with respect to the surface of the heat absorbing means so that violent ebullition of the refrigerant will take place below the free surface of the layer of lubricant during normal operation of the evaporator, and means above the free surface for collecting the lubricant conveyed upwardly with the gaseous refrigerant and for conveying such lubricant out of the chamber.

In testimony whereof I hereto affix my signature.

OTTO M. SUMMERS.